United States Patent
Emerson et al.

(10) Patent No.: US 12,222,095 B1
(45) Date of Patent: Feb. 11, 2025

(54) LIGHTWEIGHT POWERFUL LED LIGHT FOR DRONES

(71) Applicants: Daniel Emerson, Carmel, CA (US); David Tolan, Carmel, CA (US); Joseph Goldman, Carmel, CA (US)

(72) Inventors: Daniel Emerson, Carmel, CA (US); David Tolan, Carmel, CA (US); Joseph Goldman, Carmel, CA (US)

(73) Assignee: Light & Motion Industries, Marina, CA (US)

( * ) Notice: Subject to any disclaimer, the term of this patent is extended or adjusted under 35 U.S.C. 154(b) by 0 days.

(21) Appl. No.: 18/329,493

(22) Filed: Jun. 5, 2023

Related U.S. Application Data

(60) Provisional application No. 63/504,694, filed on May 26, 2023.

(51) Int. Cl.

| | |
|---|---|
| F21V 29/70 | (2015.01) |
| B64D 47/02 | (2006.01) |
| B64D 47/04 | (2006.01) |
| F21V 29/60 | (2015.01) |
| F21V 29/89 | (2015.01) |
| F21V 31/00 | (2006.01) |
| F21W 107/30 | (2018.01) |

(52) U.S. Cl.
CPC ............. *F21V 29/70* (2015.01); *B64D 47/02* (2013.01); *F21V 29/60* (2015.01); *F21V 31/005* (2013.01); *B64D 47/04* (2013.01); *B64D 2203/00* (2013.01); *F21V 29/89* (2015.01); *F21W 2107/30* (2018.01)

(58) Field of Classification Search
CPC ........ F21V 29/70; F21V 29/60; F21V 31/005; F21V 29/89; B64D 47/02; B64D 47/04; B64D 2203/00; F21W 2107/30
See application file for complete search history.

(56) References Cited

U.S. PATENT DOCUMENTS

| | | | | |
|---|---|---|---|---|
| RE46,672 | E  * | 1/2018 | Hall | G01S 7/4813 |
| 10,180,246 | B2 * | 1/2019 | Giffen | B64D 47/02 |
| 10,370,118 | B1 * | 8/2019 | Nielsen | B64D 47/06 |
| 2009/0290362 | A1 * | 11/2009 | Wei | F21K 9/00 |
| | | | | 362/373 |
| 2016/0152345 | A1 * | 6/2016 | Molnar | B64C 27/08 |
| | | | | 244/39 |
| 2017/0129601 | A1 * | 5/2017 | Babel | B64U 10/14 |
| 2017/0269198 | A1 * | 9/2017 | Hall | G01S 7/4816 |
| 2017/0305537 | A1 * | 10/2017 | Smith | B64C 39/024 |
| 2018/0186471 | A1 * | 7/2018 | Hutson | G03B 37/04 |
| 2019/0154229 | A1 * | 5/2019 | Jurek | F21S 41/143 |
| 2020/0057002 | A1 * | 2/2020 | Jung | F03D 17/00 |
| 2021/0003905 | A1 * | 1/2021 | Tolan | G03B 15/05 |

* cited by examiner

*Primary Examiner* — Tsion Tumebo
(74) *Attorney, Agent, or Firm* — Thomas M. Freiburger

(57) ABSTRACT

An LED drone light of high power and very light weight has an LED circuit board cooled by a foamed metal matrix of copper or aluminum. Preferably bonded to a disc or puck which is thermally bonded to the back of the PCB, the foamed metal matrix can be cooled by a small fan attached to the light's housing.

19 Claims, 5 Drawing Sheets

LIGHTWEIGHT POWERFUL LED LIGHT FOR DRONES

BACKGROUND AND SUMMARY OF THE INVENTION

This application claims benefit of provisional application No. 63/504,694, filed May 26, 2023.

Drones for inspection and first responder applications are growing rapidly due to the cost effective nature and advanced sensors available for drone airframes. Few companies offer lights for drones beyond navigation lights that mark the drone so other pilots can see them. Navigation lights are typically red one side and green the other to allow communication of the direction of travel to other pilots in the area. Drones may also have flashing white lights. These are low power and do not provide general illumination for lighting a subject or allowing an imaging system on the drone to see in the dark.

While on-drone lights that allow the drone to see have recently been introduced, these lights remain low power due to the payload restrictions inherent in lightweight drone platforms. The most efficient light engines are LED based. But LEDs are still less than 50% efficient at converting electrical power (or wattage) to visible light. The rest of that power is dumped into heat that must be removed from the fixture for it to continue to operate without burning out. Managing that heat requires heat sinks typically consisting of machined, extruded, die cast or stamped metal fins or pins attached to a metal plate that has the circuit board with the LEDs on one side and the fins for dissipating the heat on the opposite side. The challenge for drones is that conventional heat sinks are heavy and are a limiting factor in how much heat can be dissipated without placing too much weight or physical size on the drone.

DESCRIPTION OF PREFERRED EMBODIMENTS

Figure 1:
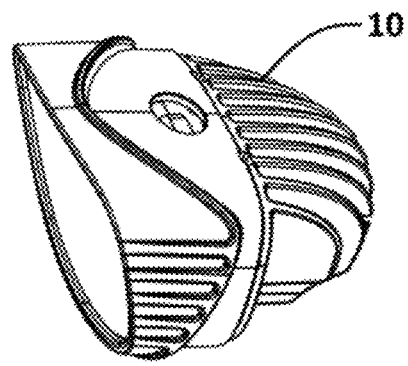
FIG. 1 shows in perspective a prior art LED bike light.

FIG. 1 shows a prior art bike light 10 marketed by the assignee of the invention. The SECA light weighs 95 grams and delivers 2500 lumens. It features a single circuit board and four LEDs with an aluminum die cast heat sink.

Figure 2:
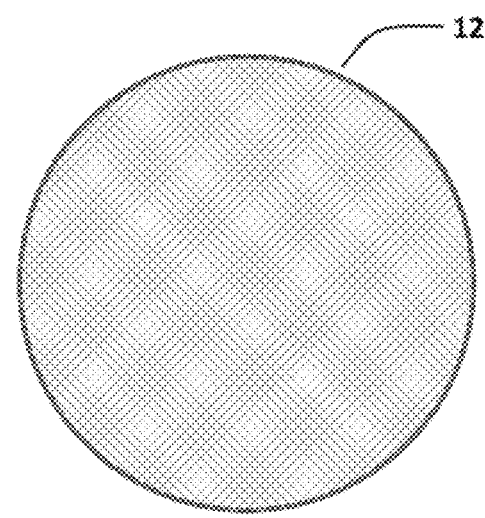
FIG. 2 is a top view of a foam metal matrix, featuring approximately 20 pores per inch.
Figure 3:
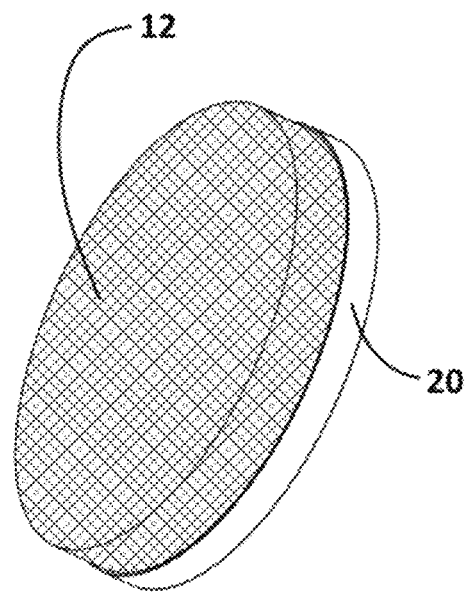
FIG. 3 is a side view of a foam metal heat sink, showing the foam metal soldered to a solid copper or aluminum puck.

By combining a novel metal matrix 12 such as shown in FIG. 2 and FIG. 3, originally developed to act as a shield to dissipate the heat blast from roadside bombs in order to protect soldiers, by brazing or other thermal bonding to one side of a thin aluminum or copper plate, the result is a very small lightweight structure with massive surface area for dissipating heat. The combination of this novel structure with a single circuit board that co-locates one or more LEDS with the power and control circuit mounted to the shared metal plate creates a light than can deliver double the power of a conventional heat sink in a significantly lighter package.

The heat sink can be a lightweight foamed metal matrix such as DUOCEL made by ERG Aerospace of Oakland, California, thermally bonded to a copper or aluminum puck on the side away from the circuit board. The light is powered by direct current from an external power source and controlled remotely through the drone's control firmware.

In a variation, the foamed metal matrix can include heat pipes thermally bonded within the matrix to aid in removing heat to areas of maximum air flow, to increase cooling efficiency.

Figure 6:
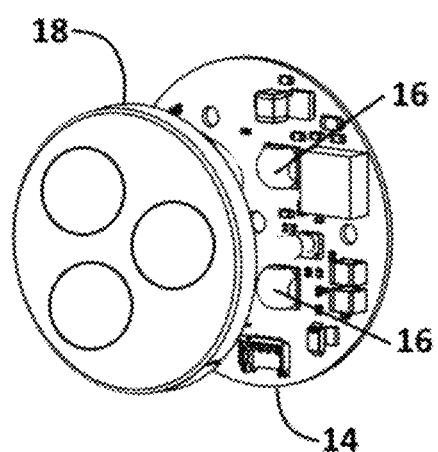
FIG. 6 is an exploded view showing a circuit board with three LEDs and driver electronics co-located, along with a focusing optic for all three LEDs.

For example, a circuit of similar design featuring four LEDs mounted to a die cast heat sink with fins, the SECA light as shown in FIG. 1 (Light & Motion Industries of Marina, California), weighs 95 grams and produces 2500 lumens. The foam metal matrix design of the invention has a similar circuit as shown in FIG. 6, and is approximately 25% smaller in volume. It weighs 75 grams-20% lighter than the conventionally cooled design, while delivering 5000 lumens, or double the light. In FIG. 6 the circuit board is shown at 14, with LEDs 16 mounted on the board, and a focusing optic at 18 provides the focus of light from each LED.

Figure 4:
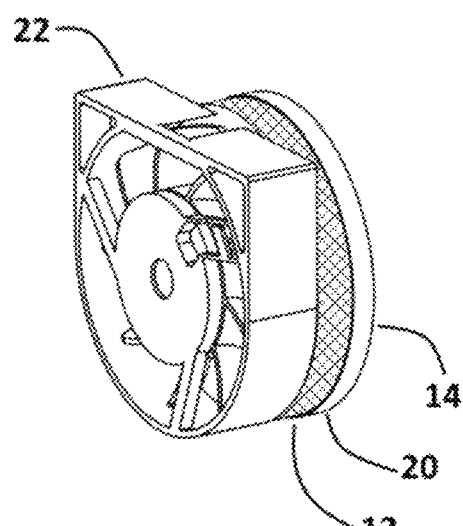
FIG. 4 shows an assembly of a PCB to a metal puck, with a foam metal heat sink on the opposite side, and with an attached fan to direct air into the foam metal to be expelled radially outwardly.

FIG. 4 shows the assembly stack with the LED circuit board 14 mounted to one side of the metal puck heat sink 20 with the foam metal 12 thermally bonded to the back side of the puck, and with a fan housing 22 containing a DC fan shown directly attached against the foam metal to accelerate the cooling effect. The heat sink puck 20 can be about two to three millimeters thick.

Figure 5:
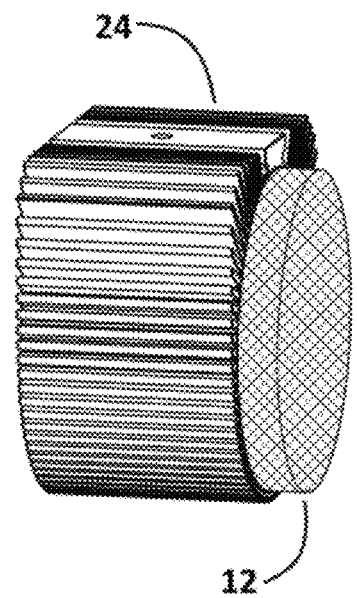
FIG. 5 shows a metal enclosure containing the heat sink at the base with a foam metal matrix thermally bonded on the back side.

FIG. 5 shows an example of a housing comprising a tubular metal enclosure 24 which is secured preferably by soldering to the side walls of the copper heat sink (interiorly or exteriorly), leaving the foam metal exposed on the rear outside while allowing the circuit and optic to be sealed in the interior to protect it from dust and water. The heat sink puck could be press-fit into the end of the tube 24, or it can be brazed or soldered into or against the end of the tube. Note that other metals such as aluminum can be used, with the foam metal preferably (but not necessarily) the same as the puck and the tube 24. If aluminum, ALUMALOY material can be used to bond the metal matrix to the puck.

Figure 7:
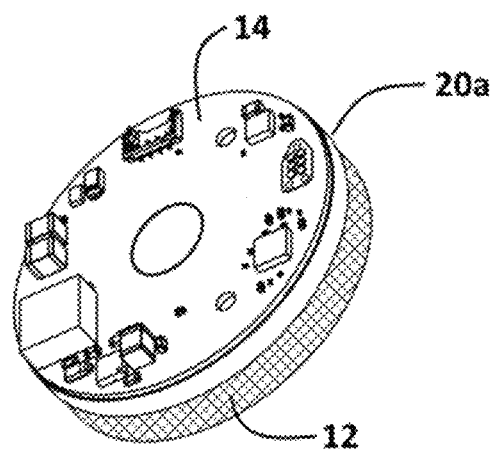
FIG. 7 is a perspective view showing a modified form of the PCB and heat sink puck assembly.

FIG. 7 shows another embodiment of an assembly or the PCB to heat sink. An aluminum puck 20a is recessed to receive the PCB 14 as shown, and the foamed metal matrix 12 is secured to the back side of the puck. In this example the LED is a COB (chip on board). As above, the puck 20a can be press-fit into the tube end or soldered or brazed into or onto the end of the tube.

Figure 8:
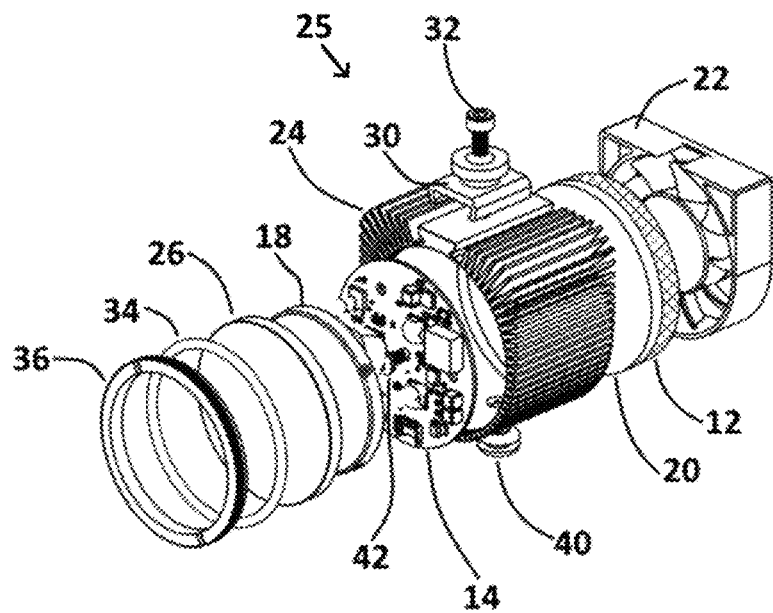
FIG. 8 is an exploded view of the drone light of the invention.

FIG. 8 shows in exploded view the drone light assembly 25 with its various components. The assembly provides a compact housing with a sealed lens or optic cover 26 to protect the circuit board 14 and optic 18 in the interior. The housing is shown augmented with external cooling fins on a preferably cylindrical body 28 to further increase cooling surface area. The body 28 fits closely over and is sealed with the housing tube 24, with solder between them in a preferred embodiment. A mount is shown on the body 28, with a mount screw 32, for securing the assembled LED light device 25 to a drone.

FIG. 8 also shows an O-ring 34 and a locking ring 36 which engage with the cooling fin body 28 or the tube 24 to seal the assembly against moisture. At 40 is indicated a rubber grommet through which wiring for the PCB 14 is to extend in sealed relationship. FIG. 8 does not indicate the order of assembly of components, as the PCB 14 has been attached to the metal puck (preferably by one or more screws 42) prior to final assembly, preferably with thermal grease between the PCB and the puck 20 for optimal heat transfer. The LED light can be controlled by MOVLINK firmware.

Figure 9:
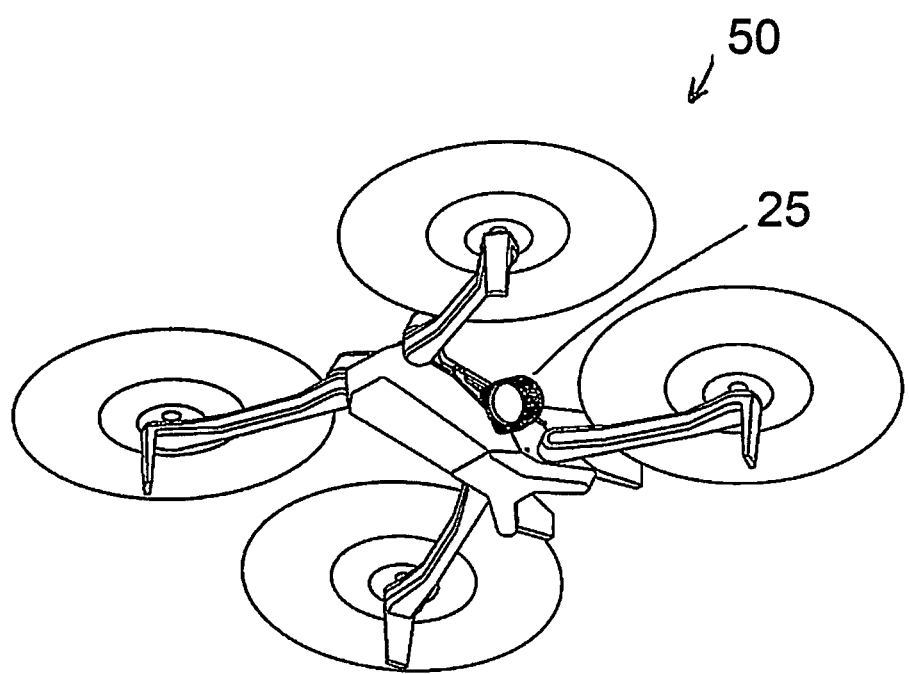
FIG. 9 schematically shows a drone with the LED light of the invention.

In FIG. 9 a drone 50 is shown carrying the LED light device 25 of the invention. The invention provides a lightweight and powerful solution to drone lighting. Note that in a drone air flow to the cooling matrix and housing is good, and the foam could be eliminated. However, for optimal LED performance the foam is preferred.

LED technology has been around for over a decade, but previously unknown was the concept of LEDs mounted as a single circuit board, with all driver electronics and the LEDs directly mounted to a heat sink, typically a thermally conductive metal plate such as aluminum or copper, that is thermally connected to a lightweight metal matrix with significant surface area for air to pass through, thereby allowing a significantly lighter, smaller and more powerful light fixture ideal for drone applications.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A lightweight LED light device on a drone, comprising:
   a housing secured on the drone,
   a single circuit board within the housing and including one or more LEDs and LED drive and control electronics,
   a focusing optic for each LED,
   a heat sink thermally connected to the circuit board, the heat sink including a lightweight foamed metal matrix thermally bonded to a thermal heat sink base or puck secured to a side of the circuit board opposite the LED and electronics, the foamed metal matrix being exposed to air for LED cooling when the drone is flown, and
   wiring connected to the LEDs and extending through the housing for connection to a power source carried on the drone,
   whereby the foamed metal matrix helps minimize weight of the drone.

2. The lightweight LED light device of claim 1, including a fan secured to the housing adjacent to the foamed metal matrix, positioned to direct air flow through the foamed metal matrix.

3. The lightweight LED light device of claim 1, wherein the housing includes a metal external enclosure thermally connected to the foamed metal matrix to provide increased cooling surface.

4. The lightweight LED light device of claim 1, wherein the housing further includes external fittings formed into an external surface of the housing, providing for attachment to the drone.

5. The lightweight LED light device of claim 1, wherein the LEDs deliver at least 4000 lumens, with the lighting device having a weight less than 80 grams.

6. The lightweight LED light device of claim 1, capable of delivering at least 3.5 lux at a distance of 100 meters.

7. The lightweight LED light device of claim 1, further including means for wireless control of operation of the lighting device from the ground.

8. The lightweight LED light device of claim 7, including control means employing USB protocol.

9. The lightweight LED light device of claim 1, wherein the heat sink includes a metal puck secured to the back of the circuit board, the foamed metal matrix being secured to the heat sink puck.

10. The lightweight LED light device of claim 9, wherein the heat sink puck is of aluminum, with the foamed metal matrix being aluminum and braised to the aluminum heat sink puck.

11. The lightweight LED light device of claim 9, wherein the heat sink puck is of aluminum, with the foamed metal matrix being aluminum and thermally bonded to the aluminum heat sink puck using a low temperature ALUMALOY material.

12. The lightweight LED light device of claim 1, wherein the outer diameter of the housing is no more than 40 mm, with a length of no more of 40 mm.

13. The lightweight LED light device of claim 1, wherein the enclosure is sealed against dust and moisture, with a front protective window connected to the housing via an O-ring and threaded closure bezel.

14. The lightweight LED light device of claim 1, wherein the housing includes an extruded metal exterior with cooling fins to increase cooling surface area.

15. The lightweight LED light device of claim 1, wherein the foamed metal matrix has at least 20 pores per inch.

16. The lightweight LED light device of claim 1, wherein the foamed metal heat sink is formed with sintered thermally conducted metal by a process of additive manufacturing, producing a lightweight open cell structure that maximizes surface area with minimal weight.

17. The lightweight LED light device of claim 1, wherein the heat sink includes a heat sink puck thermally bonded into the housing by a low temperature solder.

18. The lightweight LED light device of claim 17, wherein the heat sink puck and the housing are of aluminum, and the low temperature solder is an aluminum solder.

19. The lightweight LED light device of claim 1, wherein the foamed metal matrix includes heat pipes thermally bonded within the matrix to aid in removing heat from the back of the heat sink and delivering the heat to areas of maximum air flow, including cooling efficiency.

* * * * *

UNITED STATES PATENT AND TRADEMARK OFFICE
CERTIFICATE OF CORRECTION

PATENT NO. : 12,222,095 B1
APPLICATION NO. : 18/329493
DATED : February 11, 2025
INVENTOR(S) : Daniel Emerson, David Tolan and Joseph Goldman Page 1 of 1

It is certified that error appears in the above-identified patent and that said Letters Patent is hereby corrected as shown below:

In the Specification

Column 2, Lines 60-67 to Column 3, Lines 1-3 Should read as follows:
FIG. 8 shows in exploded view the drone light assembly 25 with its various components. The assembly provides a compact housing with a sealed lens or optic cover 26 to protect the circuit board 14 and optic 18 in the interior. The housing 24 is shown augmented with external cooling fins on the preferably cylindrical body to further increase cooling surface area. A mount 30 is shown on the cylindrical body 24, with a mount screw 32, for securing the assembled LED light device 25 to a drone.

Signed and Sealed this
Twenty-fifth Day of March, 2025

Coke Morgan Stewart
*Acting Director of the United States Patent and Trademark Office*